United States Patent
Hayasaka

(10) Patent No.: US 7,237,044 B2
(45) Date of Patent: Jun. 26, 2007

(54) INFORMATION PROCESSING TERMINAL AND TRANSFER PROCESSING APPARATUS

(75) Inventor: Kazumi Hayasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 10/806,332

(22) Filed: Mar. 23, 2004

(65) Prior Publication Data
US 2005/0097244 A1 May 5, 2005

(30) Foreign Application Priority Data
Nov. 4, 2003 (JP) ............................. 2003-374350

(51) Int. Cl.
G06F 13/00 (2006.01)
G06F 3/00 (2006.01)

(52) U.S. Cl. .......................... 710/33; 710/30

(58) Field of Classification Search ................ None
See application file for complete search history.

(56) References Cited

U.S. PATENT DOCUMENTS

| | | | | |
|---|---|---|---|---|
| 5,136,582 | A * | 8/1992 | Firoozmand | 370/400 |
| 6,708,233 | B1 * | 3/2004 | Fuller et al. | 710/22 |
| 2003/0147411 | A1 * | 8/2003 | Goosman | 370/412 |
| 2005/0129031 | A1 * | 6/2005 | Robotham et al. | 370/395.65 |
| 2006/0039374 | A1 * | 2/2006 | Belz et al. | 370/389 |

FOREIGN PATENT DOCUMENTS

| | | |
|---|---|---|
| JP | 6-314251 | 11/1994 |
| JP | 8-202650 | 8/1996 |
| JP | 10-177541 | 6/1998 |
| JP | 2001-344194 | 12/2001 |

OTHER PUBLICATIONS

Douglas E. Comer, "Internetworking with TCP/IP", 2000, Prentice Hall, 4th Ed, vol. 1, pp. 97-98.*

* cited by examiner

Primary Examiner—Donald Sparks
Assistant Examiner—David Martinez
(74) Attorney, Agent, or Firm—Staas & Halsey LLP

(57) ABSTRACT

The invention provides an apparatus wherein, when the same main data is to be transferred to a plurality of information processing terminals, passage of the same main data or descriptor on a shared bus can be suppressed to the utmost thereby to achieve improvement of the use efficiency of the shared bus and achieve efficient data transfer. The apparatus includes a first processing section for producing transfer data and a data transfer descriptor and a second processing section for transferring the transfer data. The second processing section includes a buffer capable of temporarily storing the transfer data, a merging section capable of merging first transfer data and second transfer data produced by the first processing section and stored in advance in the buffer, and a controlling section for controlling the merging section to merge in accordance with the data transfer descriptor and performing transfer control of the merged transfer data.

14 Claims, 20 Drawing Sheets

FIG. 5

| D2:MAIN DATA D DATA LENGTH | D3:23a | RSV | D4: 0 | D5: 0 | D6: 1 | D7: 0 |
|---|---|---|---|---|---|---|

D1:MAIN DATA D ADDRESS

D8: don't care

FIG. 6

| D2:HEADER PART Ha DATA LENGTH | D3:23a | RSV | D4: 0 | D5: 1 | D6: 0 | D7: 0 |
|---|---|---|---|---|---|---|

D1:INFORMATION PROCESS TERMINAL a HEADER PART Ha ADDRESS

D8: don't care

FIG. 8

| D1: INFORMATION PROCESS TERMINAL a HEADER PART Ha ADDRESS | | | | | |
|---|---|---|---|---|---|
| D2: HEADER PART Ha DATA LENGTH | D3: 23a | RSV | D4: 0 | D5: 1 | D6: 0 | D7: 1 |

| D8: INFORMATION PROCESSING TERMINAL a DESCRIPTOR Da' ADDRESS |
|---|

| D1: TRANSFER DATA Ta' ADDRESS | | | | | |
|---|---|---|---|---|---|
| D2: TRANSFER DATA Ta' DATA LENGTH | D3: don't care | RSV | D4: 0 | D5: 0 | D6: 0 | D7: 0 |

| D8: don't care |
|---|

FIG. 9

| D2:DATA LENGTH OF TRANSFER DATA | D3:don't care | RSV | D4: 0 | D5: 0 | D6: 0 | D7: 0 |
|---|---|---|---|---|---|---|
| D1:TRANSFER DATA ADDRESS ||||||||
| D8:don't care ||||||||

FIG. 10

| D2:don't care | D3:don't care | RSV | D4: 1 | D5: 0 | D6: 0 | D7: 0 |
|---|---|---|---|---|---|---|
| D1:TRANSFER DATA BUFFER NUMBER ||||||||
| D8:don't care ||||||||

FIG. 11

| D2: HEADER PART DATA LENGTH | D3: don't care | RSV | D4: 0 | D5: 0 | D6: 0 | D7: 1 |
|---|---|---|---|---|---|---|
| D1: HEADER PART ADDRESS ||||||||
| D8: MAIN DATA DESCRIPTOR ADDRESS |||||||
| D1: MAIN DATA ADDRESS |||||||
| D2: DATA LENGTH OF MAIN DATA | D3: don't care | RSV | D4: 0 | D5: 0 | D6: 0 | D7: 0 |
| D8: don't care |||||||

FIG. 12

| D2: don't care | D3: don't care | RSV | D4: 1 | D5: 0 | D6: 0 | D7: 1 |
|---|---|---|---|---|---|---|
| D1: HEADER PART BUFFER NUMBER | | | | | | |
| D8: MAIN DATA DESCRIPTOR ADDRESS | | | | | | |
| D1: MAIN DATA ADDRESS | | | | | | |
| D2: DATA LENGTH OF MAIN DATA | D3: don't care | RSV | D4: 0 | D5: 0 | D6: 0 | D7: 0 |
| D8: don't care | | | | | | |

FIG. 13

| D2: don't care | D3: MAIN DATA BUFFER NUMBER | RSV | D4: 1 | D5: 1 | D6: 0 | D7: 0 |
|---|---|---|---|---|---|---|
| | | | D1: HEADER PART BUFFER NUMBER | | | |
| D8: don't care | | | | | | |

FIG. 14

| D2: don't care | D3: BUFFER NUMBER OF TRANSFER DATA b | RSV | D4: 1 | D5: 1 | D6: 0 | D7: 1 |
|---|---|---|---|---|---|---|
| D1: TRANSFER DATA a BUFFER NUMBER ||||||||
| D8: TRANSFER DATA c DESCRIPTOR ADDRESS |||||||
| D2: don't care | D3: don't care | RSV | D4: 1 | D5: 0 | D6: 0 | D7: 0 |
| D1: TRANSFER DATA c BUFFER NUMBER |||||||
| D8: don't care |||||||

FIG. 19
PRIOR ART

| D10:0xAAAA | | |
|---|---|---|
| D20:0xBB | RSV | C FLAG: 1 |
| D30:0xZZZZ | | |

| D10:0xCCCC | | |
|---|---|---|
| D20:0xDD | RSV | C FLAG: 0 |
| D30:don't care | | |

Da: INFORMATION PROCESSING TERMINAL a DESCRIPTOR
Dn: INFORMATION PROCESSING TERMINAL n DESCRIPTOR
Ha: INFORMATION PROCESSING TERMINAL a HEADER PART
Hn: INFORMATION PROCESSING TERMINAL n HEADER PART
D: MAIN DATA

US 7,237,044 B2

INFORMATION PROCESSING TERMINAL AND TRANSFER PROCESSING APPARATUS

BACKGROUND OF THE INVENTION

1) Field of the Invention

The present invention relates to an information processing terminal and a transfer processing apparatus for transferring information to a different information processing terminal or a like apparatus by a DMA (Direct Memory Access) transfer method.

2) Description of the Related Art

First, a common platform which uses an information processing terminal which transfers (transmits) information (data) to a different processing terminal or a like apparatus by a DMA transfer method is described with reference to FIG. 15. FIG. 15 is a schematic view showing an example of a construction of a common platform. As shown in FIG. 15, an information processing terminal 100 which performs data transfer is connected to a different information processing terminal 110 which receives data transferred thereto through a connection apparatus for performing data transfer such as a LAN (Local Area Network)/WAN (Wide Area Network) 111, a public circuit 112 or a radio communication network 113.

Next, a configuration of a conventional information processing terminal (refer to, for example, patent documents 1 to 4 hereinafter listed) having a DMA transfer function is described with reference to FIG. 16. FIG. 16 is a block diagram showing a functional construction of the conventional information processing terminal 100. As shown in FIG. 16, the conventional information terminal 100 which performs data transfer by the DMA transfer method includes a central processing section 101, a transfer processing section 102 and a shared bus 103. The central processing section 101 produces main data to be transferred to the outside, information (that is, a header part) regarding the main data and a different information processing terminal 110 which is a transfer destination of the main data, and a descriptor for requesting transfer to the transfer processing section 102 described below. The transfer processing section 102 transfers data to the different information processing apparatus 110 based on the information (data) produced by the central processing section 101. The shared bus 103 is used to exchange data between a plurality of devices.

The transfer processing section 102 includes a shared bus controlling section 104 for controlling data transfer of the shared bus 103, an external port controlling section 105 for controlling transfer of main data received from the central processing section 101 through the shared bus 103 to a different information processing terminal 110, and a data transfer controlling section 106 for controlling the shared bus controlling section 104 and the external port controlling section 105 to control data transfer from the central processing section 101 to the different information processing terminal 110.

Here, operation of data transfer by the information processing terminal 100 is described with reference to FIGS. 17 to 20. FIG. 17 is a view illustrating an example of data produced by the central processing section 101 of the conventional information processing terminal 100 shown in FIG. 16; FIG. 18 is a view showing a format of a descriptor to be produced by the central processing section 101 shown in FIG. 17; FIG. 19 is a view showing an example of descriptors chained by a descriptor chaining method; and FIG. 20 is a time chart illustrating a flow of data on the shared bus 103 upon data transfer by the information processing terminal 100 shown in FIG. 17. It is to be noted that, in FIG. 17, like elements to those of FIG. 16 are denoted by like reference characters.

As shown in FIG. 17, where the same main data D is to be transferred from the information processing terminal 100 to a plurality of different information processing terminals 110 (here, a, b, . . . , n), the central processing section 101 first produces main data D and then produces header parts Ha, Hb, . . . and Hn for the information processing terminals a, b, and n which are transmission destinations, respectively. Then, the central processing section 101 individually combines the header parts Ha, Hb, . . . and Hn with the main data D to produce transfer data Ta, Tb, . . . and Tn and stores them. Here, each of the header parts Ha, Hb, . . . and Hn includes information (an address of a transfer destination of data and information of the transfer destination) of the information processing terminal a, b, . . . or n which is a transfer destination, information regarding a transfer source of the main data D, that is, the information processing terminal 100, and information regarding identity of the main data D such as a data length and a checksum of the transfer data Ta, Tb, . . . or Tn.

Then, the central processing section 101 produces descriptors (data transfer descriptors) Da, Db, . . . and Dn individually for the transfer data Ta, Tb, . . . and Tn, and issues a notification of the descriptors Da, Db, . . . and Dn to the transfer processing section 102 through the shared bus 103. Consequently, for each of the information processing terminals a, b, . . . and n, a request for transfer of the transfer data Ta, Tb, . . . or Tn is issued to the transfer processing section 102 (refer to an arrow mark (1) in FIG. 17).

A format of the conventional descriptors Da, Db, . . . and Dn produced by the central processing section 101 is illustrated in FIG. 18. The conventional descriptor shown in FIG. 18 is produced using a descriptor chaining method capable of forming descriptors relating to each other as a string of descriptors. Further, the conventional descriptor is formed so as to include an address of a transfer source of data (an address on the central processing section 101, information of a storage source) D10 which indicates a storage source of the transfer data, a transfer byte length D20 which indicates a data length of the transfer data, a C (Chain) flag D30 which indicates whether or not the descriptor is to be chained, a next descriptor address D40 which indicates a place (an address on the central processing section 101) in which a next descriptor is stored where the descriptor is to be chained. It is to be noted that a reference character RSV (Reserved) in FIG. 18 indicates a free area of the descriptor.

Accordingly, in order to issue a notification of a plurality of descriptors from the central processing section 101 to the transfer processing section 102, as shown in FIG. 19, the C flag D30 of any of the descriptors is set to "1" and a next descriptor address (here, 0xZZZZ) is written into the next descriptor address D40. Consequently, the plural descriptors are chained with each other and are successively read out from the central processing section 101 to the transfer processing section 102. Then, the C flag D30 of the last descriptor is set to "0", and consequently, the chain of descriptors is ended with this descriptor.

Incidentally, if the descriptors Da, Db, . . . and Dn are transmitted from the central processing section 101 to the transfer processing section 102 to request the transfer processing section 102 for data transfer (refer to an arrow mark (1) in FIG. 17), then the transfer processing section 102 successively reads out the transfer data Ta, Tb, . . . and Tn from the central processing section 101 based on the descriptors Da, Db, . . . and Dn and transfers the read out transfer data to the different information processing terminal 110 (refer to an arrow mark (2) in FIG. 17).

In particular, the central processing section 101 produces a number of header parts and main data equal to the number of different information processing terminals 110 which are transfer destinations and produces a number of descriptors equal to number of different information processing terminal 110 which are transfer destinations and issues a request for data transfer to the transfer processing section 102. Then, if the request for data transfer is detected, then the transfer processing section 102 starts transfer of the data to perform transfer of the object data of the request.

Operation of data transfer by the information processing terminal 100 and a flow of data passing the shared bus 103 in the process just described are described. It is assumed here that, in the information processing terminal 100, the descriptor and the header part are transmitted from the central processing section 101 to the transfer processing section 102 through the shared bus 103 in 1 t (t indicates a unit of time, a control clock unit), and the main data D is transmitted from the central processing section 101 to the transfer processing section 102 through the shared bus 103 in 2 t.

As shown in FIG. 20, when the information processing terminal 100 transfers the main data D to the information processing terminals a, b, and n, the descriptor Da for the information processing terminal a first passes the shared bus 103 and is transmitted from the central processing section 101 to the transfer processing section 102 (refer to reference character t1 in FIG. 20).

Then, in accordance with the descriptor Da, the header part Ha for the information processing terminal a and the main data D paired with each other, that is, the transfer data Ta, passes the shared bus 103 and is transmitted from the central processing section 101 to the transfer processing section 102 (refer to reference characters t2 to t4 in FIG. 20). At this time, the data transfer controlling section 106 of the transfer processing section 102 controls the shared bus controlling section 104 based on the descriptor Da for the information processing terminal a to read out the transfer data Ta from the central processing section 101 as described above, and then controls the external port controlling section 105 based on the header part Ha for the information processing terminal a to transfer the transfer data Ta to the information processing terminal a on the outside.

If the transfer of the transfer data to the information processing terminal a is completed, then a process similar to that described above is repetitively performed and, finally, the descriptor Dn for the information processing terminal n is transmitted from the central processing section 101 to the transfer processing section 102 through the shared bus 103 (refer to reference character t6 in FIG. 20). Then, the transfer data Tn formed from the header part Hn for the information processing terminal n and the main data D is transmitted from the central processing section 101 to the transfer processing section 102 through the shared bus 103 based on the descriptor Dn (refer to reference characters t7 to t9 in FIG. 20), and the transfer data Tn is transferred from the transfer processing section 102 to the information processing terminal n on the outside.

Here, different operation of data transfer by the information processing terminal 100 described herein above with reference to FIG. 16 is described with reference to FIGS. 21 and 22. FIG. 21 is a view illustrating a different example of data produced by the central processing section 101 of the conventional information processing terminal 100 shown in FIG. 16. FIG. 22 is a time chart illustrating a flow of data on the shared bus 103 upon data transfer by the information processing terminal 100 shown in FIG. 21.

In the data transfer by the information processing terminal 100 illustrated in FIG. 21, where the same main data D is to be transferred to a plurality of different information processing terminals 110, the central processing section 101 produces and stores header parts Ha, Hb, . . . and Hn similar to those described above individually for the plural information processing terminals a, b, . . . and n to which the main data D is to be transferred, respectively, and produces and stores the only one main data D to be transferred. Then, in order to individually combine the header parts Ha, Hb, . . . and Hn with the main data D and transfer resulting data to the information processing terminals a, b, and n, the central processing section 101 produces a descriptor D—D for a common data part (main data) corresponding to the main data D and a plurality of header part descriptors D-Ha, D-Hb, . . . and D-Hn corresponding to the header parts Ha, Hb, . . . and Hn, respectively.

Thereafter, the central processing section 101 uses the descriptor chaining function described hereinabove with reference to FIG. 19 to transmit the header part descriptors D-Ha, D-Hb, . . . and D-Hn for the information processing terminals a, b, . . . and n and the common data part descriptor D—D in a paired relationship to each other to the transfer processing section 102 (refer to an arrow mark (3) in FIG. 21). Further, the header parts Ha, Hb, . . . and Hn and the main data D are combined with each other to produce the transfer data Ta, Tb, and Tn, and the produced transfer data are transmitted to the information processing terminals a, b, . . . and n, respectively (refer to an arrow mark (4) in FIG. 21).

In particular, if such paired descriptors as described above are detected, then the transfer processing section 102 reads out the header parts and the main data individually from the central processing section 101 based on the descriptors, and transfers the transfer data each formed from a header part and the main data to the information processing terminals 110 based on the header parts.

At this time, as seen in FIG. 22, the descriptor D-Ha for the header part Ha for the information processing terminal a and the common data part descriptor D—D are transmitted in a paired relationship with each other from the central processing section 101 to the transfer processing section 102 through the shared bus 103 (refer to reference characters t1 and t2 in FIG. 22). Then, in accordance with the descriptors D-Ha and D—D, the header part Ha for the information processing terminal a and the main data D are transmitted in a paired relationship with each other from the central processing section 101 to the transfer processing section 102 through the shared bus 103 (refer to reference characters t3 to t5 in FIG. 22).

The data transfer controlling section 106 in the transfer processing section 102 controls the shared bus controlling section 104 based on the descriptors D-Ha and D—D to read out the header part Ha and the main data D from the central processing section 101 as described above. Thereafter, the data transfer controlling section 106 controls the external port controlling section 105 based on the header part Ha to transfer the transfer data Ta formed from the header part Ha for the information processing terminal a and the main data D to the information processing terminal a on the outside.

Then, if the transfer of the transfer data to the information processing terminal a is completed, then a process similar to that described above is repetitively performed, and finally, the descriptor D-Hn for the header part Hn for the information processing terminal n and the common data part descriptor D—D are transmitted in a paired relationship with each other from the central processing section 101 to the transfer processing section 102 through the shared bus 103 (refer to reference characters t7 and t8 in FIG. 22). Then, based on the descriptors D-Hn and D—D, the header part Hn for the information processing terminal n and the main data D are transmitted in a paired relationship with each other from the central processing section 101 to the transfer processing section 102 through the shared bust 103 (refer to reference characters t9 to t11 in FIG. 22), and the transfer data is transferred from the transfer processing section 102 to the information processing terminal n on the outside.

Incidentally, where the conventional technique described above with reference to FIGS. 20 and 22 is used in order to transfer data (main data D) having contents same as each other by the DMA transfer method from the information processing terminal 100 to a plurality of information processing terminals 110, a number of header parts, main data and descriptors for them equal to the number of the information processing terminals 110 which are transfer destinations pass on the shared bus 103. Accordingly, if the number of the information processing terminals 110 which are transfer destinations increases, then the same main data D passes on the shared bus 103 by a corresponding increased number of times as seen in FIGS. 20 and 22, and as a result, the efficiency of use of the shared bus 103 is deteriorated and the transfer performance is deteriorated.

Further, where the data transfer method which utilizes the descriptor chaining function described with reference to FIGS. 21 and 22 is used, not only a header part descriptor but also the main data descriptor D—D must pass on the shared bus 103 for each of the information processing terminals 110 which are transfer destinations. Therefore, as seen in FIG. 22, the same descriptor D—D passes many times on the shared bus 103, and also this deteriorates the efficiency of use of the shared bus and deteriorates the transfer performance.

On the other hand, while such various data (header parts, main data and descriptors) produced by the central processing section 101 of the information processing terminal 100 as seen in FIGS. 17 and 21 are transmitted from the central processing section 101 to the transfer processing section 102 through the shared bus 103, during transfer of the transfer data by the DMA transfer method, that is, within a period before the transfer processing section 102 completes the transfer of the transfer data to the different information processing terminals 110 which are transfer destinations, the shared bus 103 is occupied by the transfer of the transfer data. Therefore, where the transfer speed of a communication line which connects the transfer processing section 102 and the external information processing terminals 110 (a, b, . . . and n) which are transfer destinations is sufficiently higher than that of the shared bus 103, the data transfer capacity between the transfer processing section 102 and the information processing terminals 110 which are transfer destinations cannot be sufficiently utilized due to the low transfer speed of the shared bus 103.

If, in the situation wherein the transfer speed of the shared bus 103 is low in this manner, the same main data and descriptors pass many times on the shared bus 103 as described with reference to FIGS. 20 and 22, then the efficiency of use of the shared bus 103 significantly drops, and this significantly degrades the data transfer capacity of the communication line between the information processing terminals. Accordingly, it is demanded to raise the efficiency of use of the shared bus 103 as high as possible.

[Patent document 1]
Japanese Patent Laid-Open No. 2001-344194
[Patent document 2]
Japanese Patent Laid-Open No. 8-202650
[Patent document 3]
Japanese Patent Laid-Open No. 10-177541
[Patent document 4]
Japanese Patent Laid-Open No. 6-314251

SUMMARY OF THE INVENTION

It is an object of the present invention to provide an information processing terminal and a transfer processing apparatus wherein, when the same main data is to be transferred to a plurality of information processing terminals, passage of the same main data or descriptor on a shared bus can be suppressed to the utmost thereby to achieve improvement of the use efficiency of the shared bus and achieve efficient data transfer.

In order to attain the object described above, according to an aspect of the present invention, there is provided an information processing terminal, comprising a first processing section for producing transfer data to be transferred to the outside and a data transfer descriptor for requesting transfer of the transfer data, and a second processing section for transferring the transfer data produced by the first processing section in accordance with the data transfer descriptor received from the first processing section, the second processing section including a buffer capable of temporarily storing the transfer data, a merging section capable of merging first transfer data produced by the first processing section and stored in advance in the buffer and second transfer data produced separately from the first transfer data by the first processing section, and a controlling section for controlling the merging section to merge the first and second transfer data in accordance with the data transfer descriptor received from the first processing section and performing transfer control of the merged transfer data.

Preferably, the first processing section describes, in the data transfer descriptor to be produced to request transfer of the second transfer data to the second processing section, information of a storage source of the second transfer data and describes merge instruction information for instruction to merge the first and second transfer data, and then notifies the second processing section of the data transfer descriptor.

Further preferably, in the second processing section, the controlling section refers to the data transfer descriptor to read out the second transfer data based on the information of the storage source of the transfer data and reads out the first transfer data from the buffer based on the merge instruction information, and then controls the merging section to merge the first and second transfer data read out.

Preferably, the first transfer data is main data to be transferred to the outside, and the second transfer data is a header part including information of a transfer destination of the main data and to be added to the main data.

Preferably, where the same main data is to be transferred to a plurality of transfer destinations, the first processing section produces and writes, for each of the transfer destinations, the main data as the first transfer data into the buffer, and produces the header part as the second transfer data including the information of the transfer destination and to be added to the main data and the data transfer descriptor for requesting the merging of the header part and the main data and the transfer of the merged data and notifies the second processing section of the data transfer descriptor.

Further, in order to attain the object described above, according to another aspect of the present invention, a transfer processing apparatus for transferring transfer data produced by a processing section in accordance with a data transfer descriptor received from the processing section, comprising a buffer capable of temporarily storing the transfer data, a merging section capable of merging first transfer data produced by the processing section and stored in advance in the buffer and second transfer data produced separately from the first transfer data by the processing section, and a controlling section for controlling the merging section to merge the first and second transfer data in accordance with the data transfer descriptor and performing transfer control of the merged transfer data.

According to the present invention, in order to transfer one main data (first transfer data) to a plurality of external information processing terminals, main data stored in advance in the buffer and header parts (second transfer data) including transfer source information of the main data are merged with each other by the merging section of the second processing section (transfer processing apparatus) in accordance with a data transfer descriptor received from the first processing section, and the merged transfer data is transferred to the external information processing terminals by the controlling section. Consequently, the same main data can be transferred to a plurality of external information processing terminals by passing the data on the shared bus only once without passing the main data many times on the shared bus for exchanging data between the first and second processing sections as in the conventional information processing terminal described hereinabove. Accordingly, deterioration of the use efficiency of the shared bus can be suppressed with certainty, and efficient data transfer can be achieved.

Besides, since only it is necessary to transmit, individually for the external information processing terminals which are transfer destinations, only the header parts corresponding to data transfer description and each information processing terminal from the first processing section to the second processing section, by whatever number the number of information processing terminals which are transfer destinations increases, the use efficiency of the shared bus does not vary and a constant use efficiency can be secured. In short, with the information processing terminal of the present invention, two data including main data and a header part can be transferred to external information processing terminals using only one data transfer descriptor produced by the first processing section.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5 is a view showing an example of a descriptor for common data produced by the central processing section of the information processing terminal as the embodiment of the present invention;

FIG. 6 is a view schematically showing a header part Ha descriptor produced by the central processing section of the information terminal as the embodiment of the present invention;

FIGS. 8 to 14 are views individually showing different examples of a descriptor produced by the central processing section of the information processing terminal of the present invention;

FIG. 19 is a view schematically showing an example of a descriptor which adopts a descriptor chaining method;

DESCRIPTION OF THE PREFERRED EMBODIMENT

In the following, an embodiment of the present invention is described with reference to the drawings.

[1] Embodiment of the Invention

Figure 1:
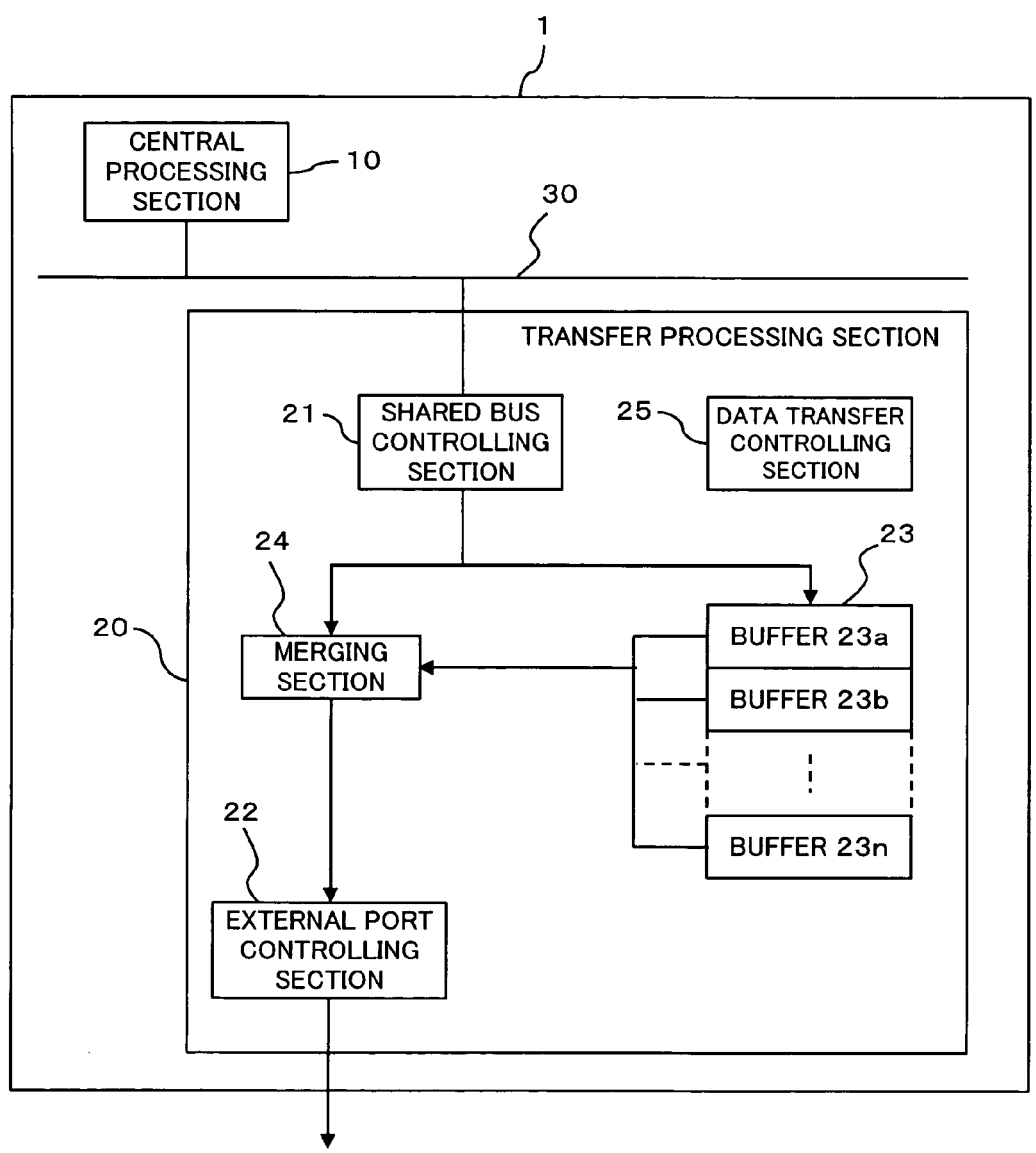
FIG. 1 is a block diagram showing a functional configuration of an information processing terminal as an embodiment of the present invention.
Figure 2:
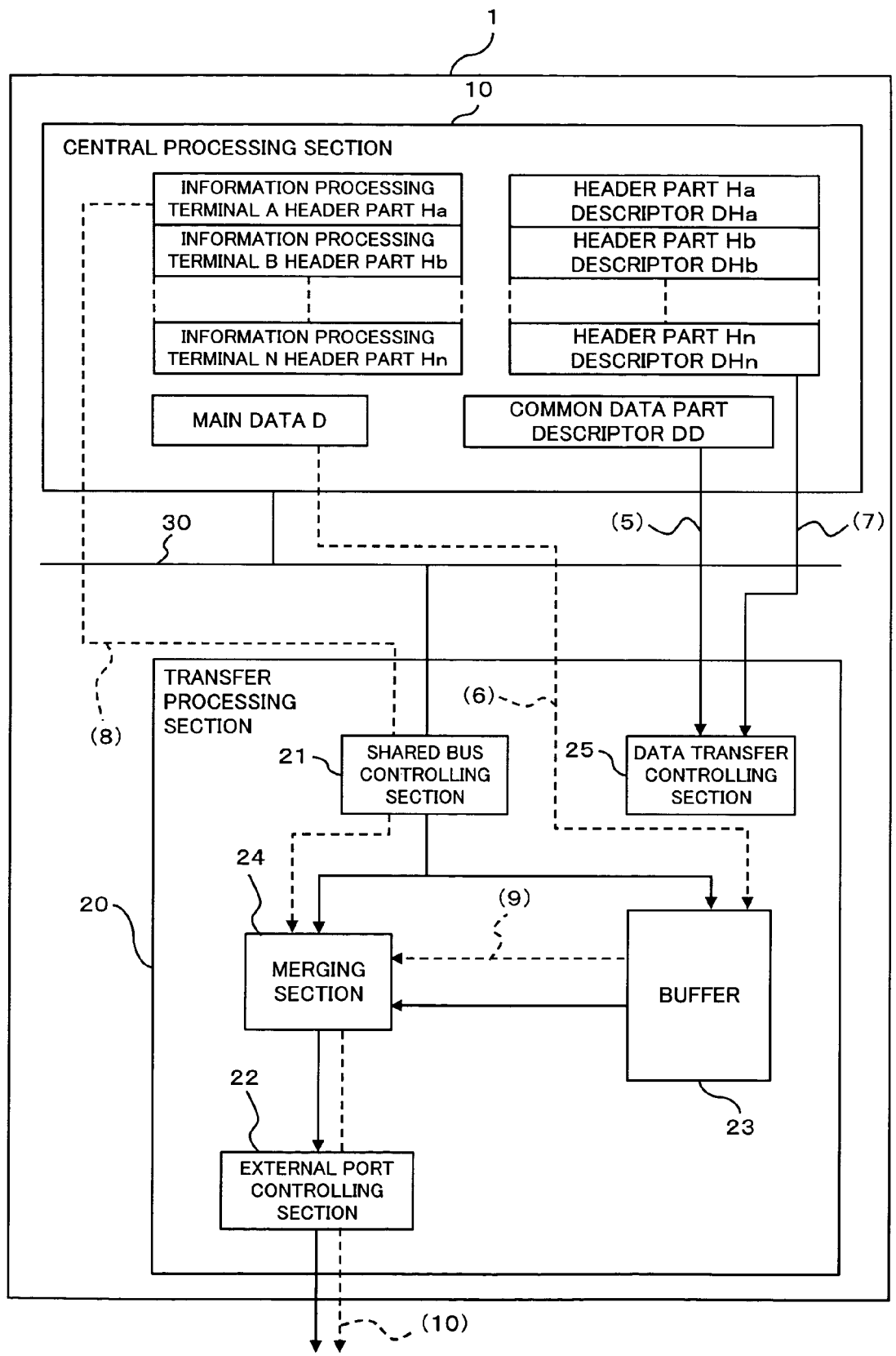
FIG. 2 is a block diagram illustrating data produced by a central processing section of the information processing apparatus as the embodiment of the present invention.
Figure 3:
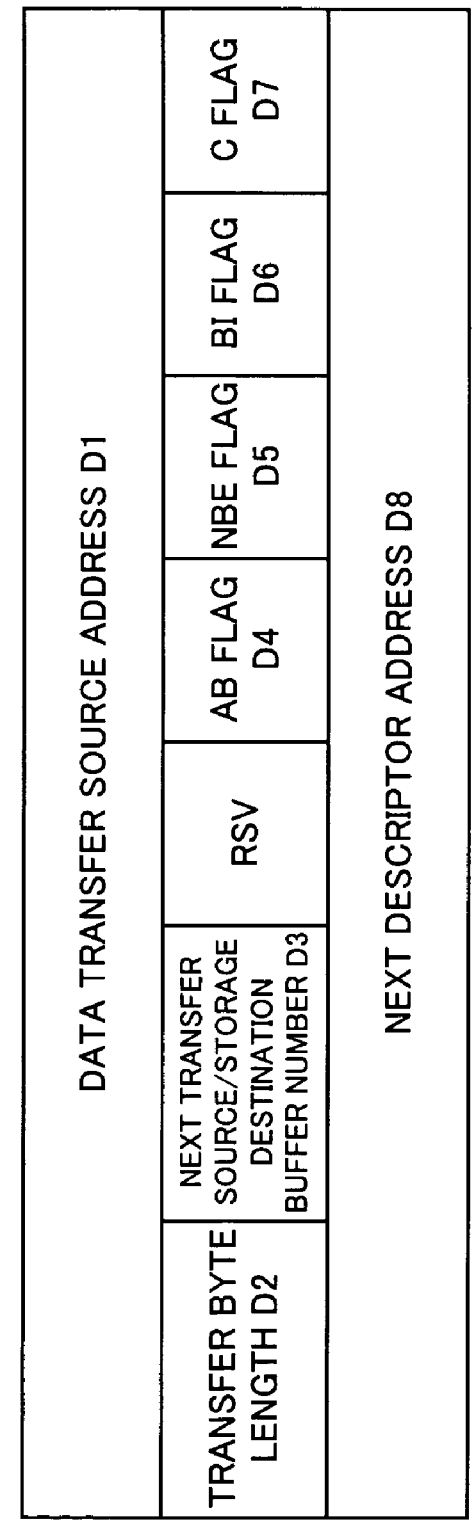
FIG. 3 is a view showing a format of a descriptor produced by the central processing section of the information processing terminal as the embodiment of the present invention.
Figure 4:
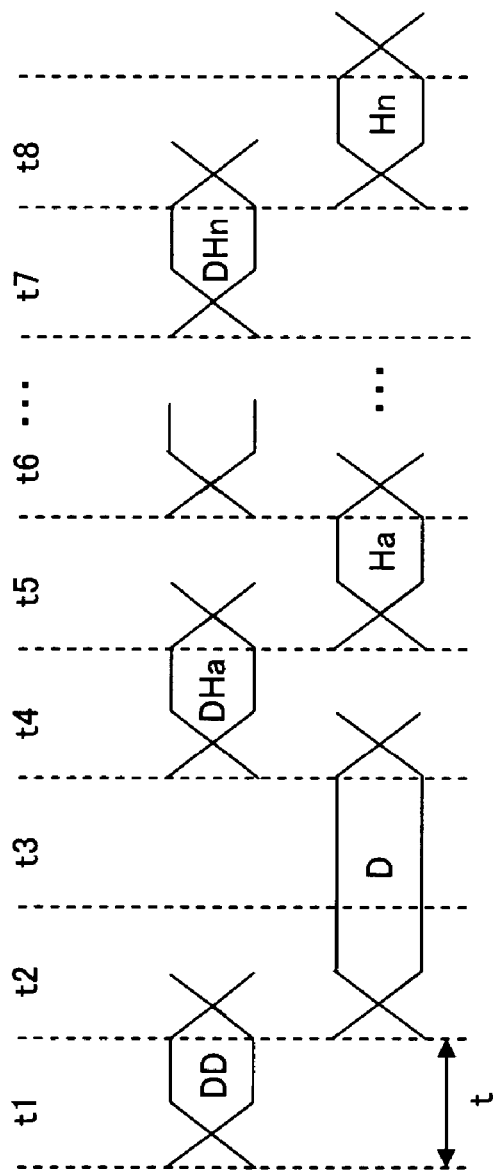
FIG. 4 is a time chart illustrating a flow of data on a shared bus upon data transfer by the information processing terminal as the embodiment of the present invention.

FIGS. 1 to 6 show an information processing terminal as an embodiment of the present invention. FIG. 1 is a block diagram showing a functional configuration of the information processing terminal; FIG. 2 is a view illustrating data produced by a central processing section of the information processing terminal; FIG. 3 is a view showing a format of a descriptor produced by the central processing section; FIG. 4 is a time chart showing a flow of data on a shared bus upon data transfer by the information processing terminal; FIG. 5 is a view showing an example of a descriptor for common data produced by the central processing section in the information processing terminal; and FIG. 6 is a view schematically showing a descriptor for a header part Ha produced by the central processing section of the information processing terminal.

Figure 15:
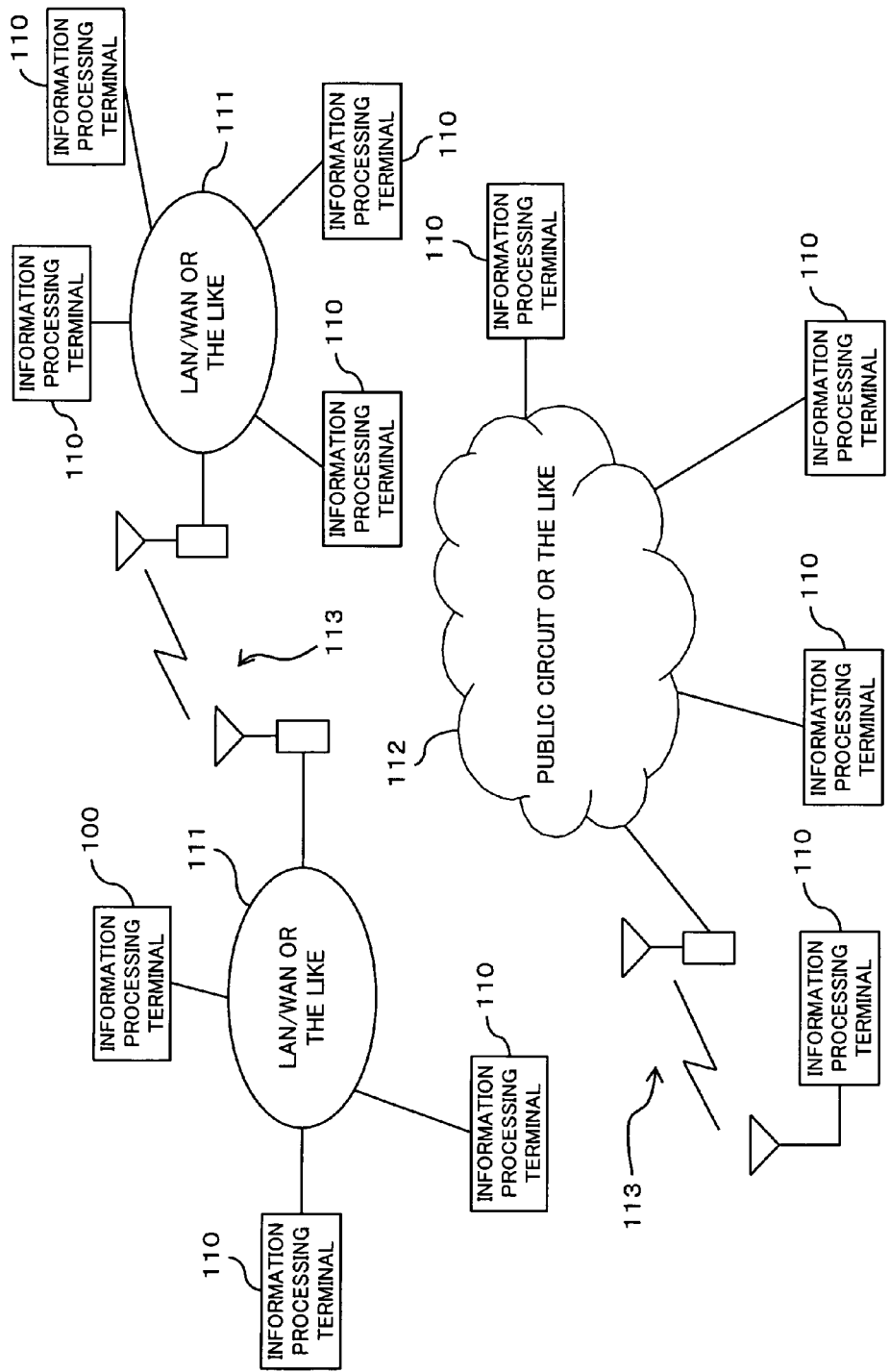
FIG. 15 is a schematic view simply showing an example of a construction of a platform which includes an information processing terminal for transferring (transmitting) information (data) to different information processing terminals.
Figure 16:
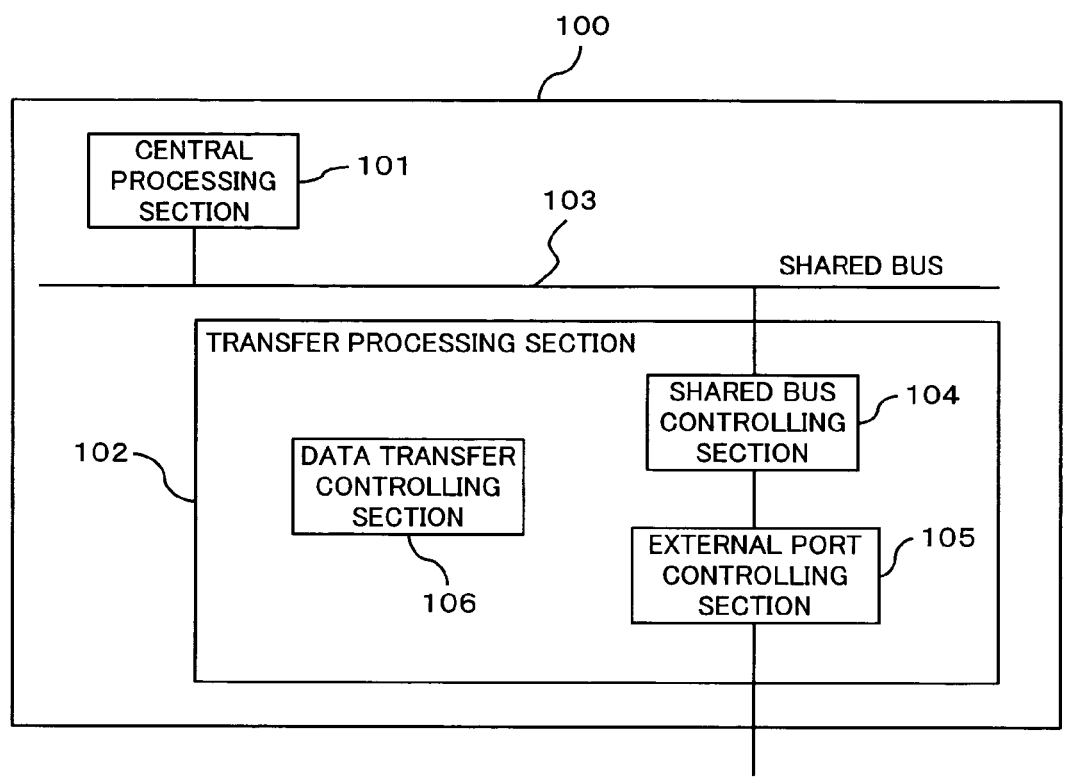
FIG. 16 is a block diagram showing a functional configuration of a conventional information processing terminal which transfers information.

Also an information processing terminal 1 in the present embodiment shown in FIG. 1 is used, for example, in such a platform as shown in FIG. 15, and has the DMA transfer function and transfers data to the outside (a different information processing terminal or a like apparatus). As shown in FIG. 1, the information processing terminal 1 in the present embodiment includes a central processing section (first processing section) 10, a transfer processing section (second processing section, transfer processing apparatus) 20, and a shared bus 30.

The central processing section 10 produces main data (first transfer data) to be transferred to the outside, a header part (second transfer data) including information of a transfer destination (here, information regarding a different information processing terminal which is a transfer destination and other necessary information) of the main data and to be added to the main data, a descriptor which is a data transfer descriptor for requesting transfer of the first and second transfer data (hereinafter referred to simply as transfer data where the first and second transfer data are not distinguished from each other) to the transfer processing section 20, and another descriptor which is a buffer writing descriptor for requesting writing of the main data into a buffer 23 hereinafter described to the transfer processing section 20.

It is to be noted that merge instruction information for causing a merging section 24 hereinafter described to merge the main data (first transfer data) stored in the buffer 23 and the header part (second transfer data) is included in the descriptor which is a data transfer descriptor.

The transfer processing section 20 includes a shared bus controlling section 21 for controlling data transfer on the shared bus 30, an external port controlling section 22 for controlling transfer of transfer data received from the central processing section 10 to the outside through the shared bus 30, a buffer 23 capable of temporarily storing the main data and a data length of the main data, a merging section 24 for merging the main data stored in the buffer 23 and the header part received from the central processing section 10, and a data transfer controlling section 25 for generally controlling data transfer by the shared bus controlling section 21, external port controlling section 22, buffer 23 and merging section 24.

It is to be noted that the buffer 23 is partitioned into a plurality of partitions 23a, 23b, . . . and 23n (the reference characters 23a, 23b, . . . and 23n are hereinafter used individually as buffer numbers for specifying the partitions), and is formed such that a plurality of data (main data and so forth) can be temporarily stored therein.

Here, the data transfer by the information processing terminal 1 and the data produced by the central processing section 10 in the information processing terminal 1 are described with reference to FIGS. 2 to 6.

As shown in FIG. 2, in order to transfer the same main data D from the information processing terminal 1 to a plurality of different information processing terminals a, b, . . . and n, the central processing section 10 first produces and stores only one main data D to be transferred, and then produces and stores header parts Ha, Hb, . . . and Hn for the information processing terminals a, b, . . . and n which are transfer destinations. Here, the header parts Ha, Hb, . . . and Hn include information (an address of a data transfer destination and information of the transfer destination) of the information processing terminals a, b, . . . and n which are transfer destinations, information of a transfer source of the main data D (an address of the information processing terminal 1 which transfers the main data D and so forth), and information regarding the identity of the main data D such as a checksum.

Then, the central processing section 10 of the information processing terminal 1 produces a descriptor DD for the common data which is a buffer writing descriptor for writing (temporarily storing) the main data D into the buffer 23 of the transfer processing section 20, and issues a notification of the descriptor DD to the transfer processing section 20 through the shared bus 30. Consequently, the transfer processing section 20 is requested to write the main data D into the buffer 23 (refer to an arrow mark (5) in FIG. 2).

Further, the central processing section 10 produces header part descriptors DHa, DHb, . . . and DHn which are data transfer descriptors for the corresponding header parts Ha, Hb, and Hn, and issues a notification of the descriptors DHa, DHb, . . . and DHn to the transfer processing section 20 through the shared bus 30. Consequently, the transfer processing section 20 is requested to merge the header parts Ha, Hb, . . . and Hn with the main data D and transfer the merged transfer data individually for the information processing terminal a, b, . . . and n (refer to an arrow mark (7) in FIG. 2).

A format of the descriptors DD, DHa, DHb, . . . and DHn produced by the central processing section 10 is shown in FIG. 3. The descriptors DD, DHa, DHb, . . . and DHn produced by the central processing section 10 shown in FIG. 3 adopt the descriptor chaining method which forms descriptors relating to each other into a series of descriptors. The common data part descriptor DD and the header part descriptors DHa, DHb, . . . and DHn individually have similar formats to each other. In particular, the descriptors DD, DHa, DHb, . . . and DHn are formed so as to retain:

(a) a data transfer source address D1 which is information of a storage source (a buffer number of the buffer 23 or an address on the central processing section 10) of the transfer data (the main data D or the header part Ha, Hb, . . . or Hn);

(b) a transfer byte length D2 which indicates a data length of the data retained at the data transfer source address D1;

(c) a next transfer source/storage destination buffer number D3 which indicates a storage destination buffer number of data to be stored into the buffer 23 which is information (information validated where an NBE flag D5 hereinafter described is set to "1" set where the transfer data (data in the data transfer source address D1) whose transfer is to be requested by the present descriptor and the data to be merged with the transfer data are stored in the buffer 23, and which is a storage source buffer number of the data to be merged or information (information validated where a BI flag D6 hereinafter described is set to "1" for setting into which partition (that is, which buffer number) of the buffer 23 the data to be stored into the buffer 23 by the present descriptor (the data in the data transfer source address D1) is to be stored;

(d) an AB (Address or Buffer No.) flag D4 which indicates whether the data transfer source address D1 represents the address on the central processing section 10 or the buffer number of the buffer 23;

(e) an NBE (Next Buffer No. Enable) flag D5 which indicates whether or not the transfer data retained at the data transfer source address D1 and the data stored in the buffer 23 are to be merged with each other (whether or not the next transfer source/storage destination buffer number D3 is to be validated);

(f) a BI (Buffer In) flag D6 which indicates whether or not the data is to be written into the buffer 23, that is, which one of a next transfer source buffer number and a transfer destination buffer number the next transfer source/storage destination buffer number D3 represents;

(g) a C (chain) flag D7 which indicates whether or not the descriptor is to be chained with each other; and (h) a next descriptor address D8 which indicates a place (address) in which a next descriptor is placed where the descriptor is to be chained (where the C flag D7 is "1").

It is to be noted that reference character RSV (Reserved) in FIG. 3 indicates a free area of the descriptor.

It is to be noted that "0" or "1" is placed into the AB flag D4, NBE flag D5, BI flag D6 and C flag D7. Where the AB flag D4 is "0", it indicates a fact that the data transfer source address D1 represents an address on the central processing section 10, but where the AB flag D4 is "1", it indicates another fact that the data transfer source address D1 represents the buffer number on the buffer 23 in the transfer processing section 20.

Further, where the NBE flag D5 is "0" and the BI flag D6 is "0", they indicate a fact that the data retained at the data transfer source address D1 and the data stored in the buffer 23 are not to be merged (the next transfer source/storage destination buffer number D3 is invalid). Where the NBE flag D5 is "1" and the BI flag D6 is "0", they indicate another fact that the data retained at the data transfer source address D1 and the data stored in the buffer 23 are to be merged with each other by the merging section 24 (the next transfer source/storage destination buffer number D3 is valid, and the next transfer source/storage destination buffer number D3 indicates the next transfer source buffer number). Where the NBE flag D5 is "0" and the BI flag D6 is "1", they indicate a further fact that the data retained at the data transfer source address D1 is to be written into the buffer 23 of the buffer number indicated by the next transfer source/storage destination buffer number D3.

In particular, where the BI flag D6 is "0", it indicates a fact that the descriptor is a data transfer descriptor (in the present embodiment, the header part descriptor DHa, DHb, . . . or DHn) for requesting transfer of the data at the data transfer source address D1 to the external information processing terminal to the transfer processing section 20. On the other hand, where the BI flag D6 is "1", it indicates another fact that the descriptor is a buffer writing descriptor (in the present embodiment, the common data part descriptor DD) for requesting writing of the data at the data transfer source address D1 into the buffer 23 to the transfer processing section 20. It is to be noted that both of the NBE flag D5 and the BI flag D6 are not set to "1" simultaneously.

Further, where the C flag D7 is "0", it indicates a fact that the descriptor is not to be chained to a next descriptor, but where the C flag D7 is "1", it indicates another fact that the descriptor is to be chained to a next descriptor.

Incidentally, if a descriptor DD hereinafter described with reference to FIG. 5 is transmitted from the central processing section 10 to the transfer processing section 20 to request the transfer processing section 20 to write the main data D into the buffer 23 (refer to an arrow mark (5) in FIG. 2), then the transfer processing section 20 reads out the main data D from the central processing section 10 based on the descriptor DD and stores the read out data into the buffer 23 (refer to an arrow mark (6) in FIG. 2).

Thereafter, if the descriptors DHa, DHb, . . . and DHn are successively transmitted from the central processing section 10 to the transfer processing section to request the transfer processing section 20 for data transfer (refer to an arrow mark (7) in FIG. 2), then the transfer processing section 20 successively reads out the header parts Ha, Hb, . . . and Hn from the central processing section 10 based on the descriptors DHa, DHb, and DHn (refer to an arrow mark (8) in FIG. 2) and extracts the main data D from the buffer 23 (refer to an arrow mark (9) in FIG. 2). Then, the transfer processing section 20 merges the main data D and the header parts Ha, Hb, . . . and Hn in the merging section 24 and transfers the merged data (transfer data) to the information processing terminals a, b, and n (refer to an arrow mark (10) in FIG. 2).

It is to be noted that, at this time, the next transfer source/storage destination buffer number D3 is placed into the header part descriptors DHa, DHb, and DHn which are data transfer descriptors and the NBE flag D5 thereof is set to "1" as hereinafter described with reference to FIG. 6. In this case, the NBE flag D5 of the header part descriptors DHa, DHb, . . . and DHn indicates an instruction to merge the header part Ha, Hb, . . . and Hn and the main data D.

Next, operation of data transfer by the information processing terminal 1 and a flow of data which passes on the shared bus 30 in a case wherein the main data D is transferred to the external information processing terminals a, b, . . . and n by the information processing terminal 1 in the present embodiment are described with reference to FIG. 4. Here, it is assumed that, also in the information processing terminal 1, the descriptors and header parts are transmitted at 1 t (t indicates a unit of time, a unit of a control clock) on the shared bus 30 from the central processing section 10 to the transfer processing section 20, and the main data D is transmitted at 2 t on the shared bus 30 from the central processing section 10 to the transfer processing section 20.

As seen in FIG. 4, a request for writing of the main data D from the central processing section 10 into the buffer 23, that is, the common data (main data D) descriptor DD which is a buffer writing descriptor, is first transmitted from the central processing section 10 to the transfer processing section 20 through the shared bus 30 (refer to reference character t1 in FIG. 4). Then, the main data D is transmitted from the central processing section 10 to the transfer processing section 20 through the shared bus 30 in accordance with the common data part descriptor DD (refer to reference characters t2 and t3 in FIG. 4), and then written into the buffer 23 of the transfer processing section 20 (here, into a partition of the buffer number "23a"; hereinafter referred to simply as buffer 23a). Further, at this time, also a transfer byte length (data length) of the main data D is stored into the buffer 23a together with the main data D.

At this time, the data transfer process controlling section 25 of the transfer processing section 20 controls the shared bus controlling section 21 based on the shared bus descriptor DD to read out the main data D from the central processing section 10 (data transfer source address D1 in the common data part descriptor DD) as described above and stores the main data D and the data length of the main data D into the buffer 23a based on the common data part descriptor DD as described above.

It is to be noted that an instruction for writing (storage) of data into the buffer 23 is issued from the central processing section 10, and the data is stored into a partition having a buffer number indicated by the next transfer source/storage destination buffer number D3 of the common data part descriptor DD. Then, the central processing section 10 produces the several descriptors DHa, DHb, . . . and DHn based on the information just described.

A configuration of the common data part descriptor DD is shown in FIG. 5. As seen in FIG. 5, in the common data part descriptor DD, an address of the main data D on the central processing section 10 is set as the data transfer source address D1, and the transfer byte length (data length) of the main data D is set as the transfer byte length D2. Further, the AB flag D4, NBE flag D5, BI flag D6 and C flag D7 are set to "0", "0", "1", "0", respectively, and a storage destination buffer number 23a for storing the main data D is placed into the next transfer source/storage destination buffer number D3. It is to be noted that the next descriptor address D8 is invalidated ("don't" care in FIG. 5).

Next, a request for data transfer of the main data D to the information processing terminal a from the central processing section 10 to the transfer processing section 20, that is, the header part Ha descriptor DHa for the information processing terminal a, is transmitted from the central processing section 10 to the transfer processing section 20 through the shared bus 30 (refer to reference character t4 in FIG. 4). Then, the header part Ha is transmitted from the central processing section 10 to the transfer processing section 20 through the shared bus 30 in accordance with the header part Ha descriptor DHa (refer to reference character t5 in FIG. 4). Thereafter, the header part Ha and the main data D stored in the buffer 23a are merged by the merging section 24, and the merged transfer data (header part Ha and main data D) is transferred to the information processing terminal a.

At this time, the data transfer controlling section 25 of the transfer processing section 20 controls the shared bus controlling section 21 based on the header part Ha descriptor DHa to read out the header part Ha from the central processing section 10 as described above. Then, the data transfer controlling section 25 controls the merging section 24 based on the header part Ha descriptor DHa to merge the header part Ha and the main data D as described above. Thereafter, the data transfer controlling section 25 controls the external port controlling section 22 based on the header part Ha descriptor DHa to transfer the transfer data (header part Ha and main data D) merged as described above to the information processing terminal a.

Here, a configuration of the header part Ha descriptor DHa for the information processing terminal a is shown in FIG. 6. As seen in FIG. 6, in the header part Ha descriptor DHa, an address of the header part Ha on the central processing section 10 is set as the data transfer source address D1, and a transfer byte length (data length) of the header part Ha is set as the transfer byte length D2. Further, the buffer number "23a" (that is, next transfer source buffer number) at which the main data D is stored is set as the next transfer source/storage destination buffer number D3, and the AB flag D4, NBE flag D5, BI flag D6 and C flag D7 are set to "0", "1", "0", "0", respectively. It is to be noted that the next descriptor address D8 is invalidated ("don't care" in FIG. 6).

Then, after the transfer of the transfer data to the information processing terminal a is completed, only the header part descriptors DHb, and DHn are successively transmitted from the central processing section 10 to the transfer processing section 20 and a process similar to that described above is repetitively performed. Finally, the header part Hn descriptor DHn for the information processing terminal n is transmitted from the central processing section 10 to the transfer processing section 20 through the shared bus 30 (refer to reference character t7 in FIG. 4), and the header part Hn is transmitted from the central processing section 10 to the transfer processing section 20 through the shared bus 30 in accordance with the header part Hn descriptor DHn (refer to reference character t8 in FIG. 4). Then, the header part Hn and the main data D stored in the buffer 23a are merged with each other by the merging section 24 as described above, and the merged transfer data (header part Hn and main data D) is transferred to the information processing terminal n.

It is to be noted that the header part descriptors DHb, . . . and DHn individually have a configuration similar to that of the header part Ha descriptor DHa for the information processing terminal a shown in FIG. 6. Further, in the header part descriptors DHb, . . . and DHn, addresses of the header parts Hb, . . . and Hn individually corresponding to the header part descriptors DHb, . . . and DHn on the central processing section 10 are set as the data transfer source address D1, and data lengths of the header parts Hb, . . . and Hn are set as the transfer byte length D2. It is to be noted that setting other than those just described is performed similarly as in that of the header part Ha descriptor DHa.

In this manner, with the information processing terminal 1 as the embodiment of the present invention, where one data (main data D) is to be transferred to the plural external information processing terminal a, b, . . . and n, the main data D is transmitted only once from the central processing section 10 to the transfer processing section 20 based on a writing request by the common data part descriptor DD, and the transfer processing section 20 writes the main data D into the buffer 23 and merges the header parts Ha, Hb, . . . and Hn for the information processing terminals a, b, . . . and n and the main data D in the merging section 24 based on a transfer request by the header part descriptors DHa, DHb, . . . and DHn, and then transfers the merged transfer data to the information processing terminal a, b, . . . and n. Therefore, if the main data D passes only once on the shared bus 30 without repetitively passing the main data D as in the conventional information processing terminal described above, then the same main data D can be transferred to the plural information processing terminal a, b, . . . and n. Consequently, degradation of the use efficiency of the shared bus 30 can be suppressed with certainty and data transfer can be performed with a high efficiency.

Further, after the main data D is stored into the buffer 23, only it is necessary to transmit, individually for the information processing terminals a, b, . . . and n which are transfer destinations, only the header part descriptors DHa, DHb, . . . and DHn and the header parts Ha, Hb, . . . and Hn from the central processing section 10 to the transfer processing section 20. Therefore, by whatever number that the number of information processing terminals which are transfer destinations increases, the use efficiency of the shared bus 30 does not vary and constant use efficiency can be secured.

In particular, with the descriptors (header part descriptors DHa, DHb, . . . and DHn) produced by the central processing section 10 of the information processing terminal 1 according to the present embodiment, two data (header part Ha, Hb, . . . and Hn and main data D) can be transferred using one descriptor.

Besides, in the descriptors produced by the conventional information processing terminal, they must be produced so as to retain an address of the main data D to be transferred on the central processing section. However, in the descriptors DHa, DHb, . . . and DHn produced by the central processing section 10 of the information processing terminal 1 according to the present embodiment, only it is necessary to retain only a number of a buffer in which the main data D having a smaller information capacity than that of the address just described is placed, and as a result, the capacity of the descriptors themselves can be reduced. Therefore, the capacity of data to be passed on the shared bus 30 can be reduced and degradation of the use efficiency of the shared bus 30 can be suppressed with a higher degree of certainty.

Further, with the information processing terminal 1 according to the present embodiment, when the main data D is stored into the buffer 23, also the transfer byte length (data length) of the main data D is stored into the buffer 23. Therefore, the descriptors need not be formed so as to retain the data length of the main data D as in those in the conventional information processing terminal. Also this can reduce the capacity of the descriptors and can suppress degradation of the use efficiency of the shared bus 30 with a higher degree of certainty.

Further, also in the data to be produced by the central processing section 10 of the information processing terminal 1 according to the present embodiment, the central processing section need not produce header parts and main data in a paired relationship with each other and need not merge the header parts and the main data with each other as in that of the conventional information processing terminal described hereinabove. Therefore, the process in the central processing terminal 10 can be simplified.

[2] Others

It is to be noted that the present invention is not limited to the embodiment specifically described above but can be carried out in various modified forms without departing from the scope of the present invention.

For example, while, in the embodiment described above, the descriptors DHa, DHb, . . . , DHn produced by the central processing section 10 of the information processing terminal according to the present invention are not chained, they may otherwise be chained. In this instance, the C flag D7 of the descriptors DHa, DHb, . . . , DHn is set to "1" while an address on the central processing section 10 of a head part descriptor for a next information processing terminal which is a next descriptor is retained in the next descriptor address D8.

Figure 7:
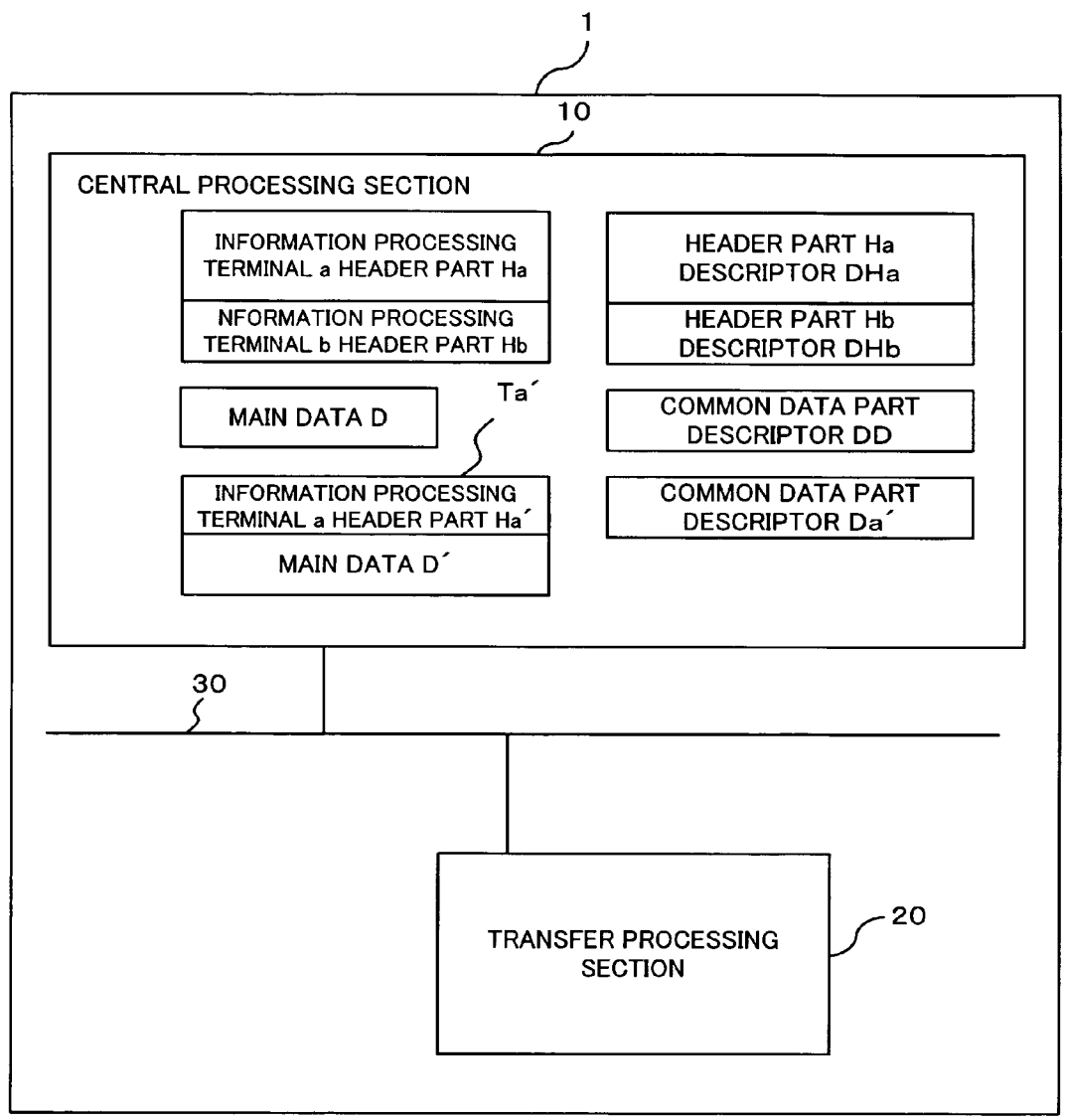
FIG. 7 is a view illustrating a different example of data produced by the central processing section of the information processing terminal as the embodiment of the present invention.

Further, while, in the embodiment described above, it is described that the main data D is transferred to the information processing terminals a, b, n, in order to transfer main data D to the information processing terminals a and b and transfer main data D' only to the information processing terminal a, the information processing terminal 1 according to the present invention operates in the following manner. In particular, as seen in FIG. 7, the central processing section 10 produces only one main data D and produces common data part descriptor DD for writing the main data D into the buffer 23. Furthermore, the central processing section 10 produces an information processing terminal a header part Ha, an information processing terminal b header part Hb, a header part Ha descriptor DHa and a header part Hb descriptor DHb for transferring the main data D.

Further, the central processing section 10 produces transfer data Ta' wherein the main data D' and the information processing terminal a header part Ha' for transferring the main data D' to the information processing terminal a are paired with each other and then produces information processing terminal a descriptor Da'. It is to be noted that, while the transfer processing section 20 is omitted for simplified illustration in FIG. 7, it has a configuration similar to that of the transfer processing section 20 shown in FIGS. 1 and 2.

Where the header part Ha descriptor DHa and the information processing terminal a descriptor Da' produced by the central processing section 10 are to be chained, the descriptors of them have such a configuration as shown in FIG. 8. In particular, the header part Ha descriptor DHa has a configuration similar to but is different from that of the header part Ha descriptor DHa shown in FIG. 6 only in that the C flag D7 is "1" and an address on the central processing section 10 of the information processing terminal a descriptor Da' which is a next descriptor is set as the next descriptor address D8.

Further, in the information processing terminal a descriptor Da', a transfer data Ta' address is set as the data transfer source address D1, and a Ta' data length is set as the transfer byte length D2. Further, the AB flag D4, NBE flag D5, BI flag D6 and C flag D7 are set to "0", and the next transfer source/storage destination buffer number D3 and the next descriptor address D8 are invalidated ("don't care" in FIG. 8).

Such chain descriptors DHa and Da' are used to transmit the header part Ha, main data D and main data D' from the central processing section 10 to the transfer processing section 20 so that they are transferred to the external information processing terminal a. In other words, with the information processing terminal 1 according to the present invention, the three different data of the header part Ha, main data D and transfer data Ta' can be transferred by the two descriptors DHa and Da'.

Further, with a description having the format configuration shown in FIG. 3 which is used in the information processing terminal according to the present invention, such various types of data transfer as described in the following paragraphs (1) to (6) can be performed in addition to the data transfer described above.

Figure 17:
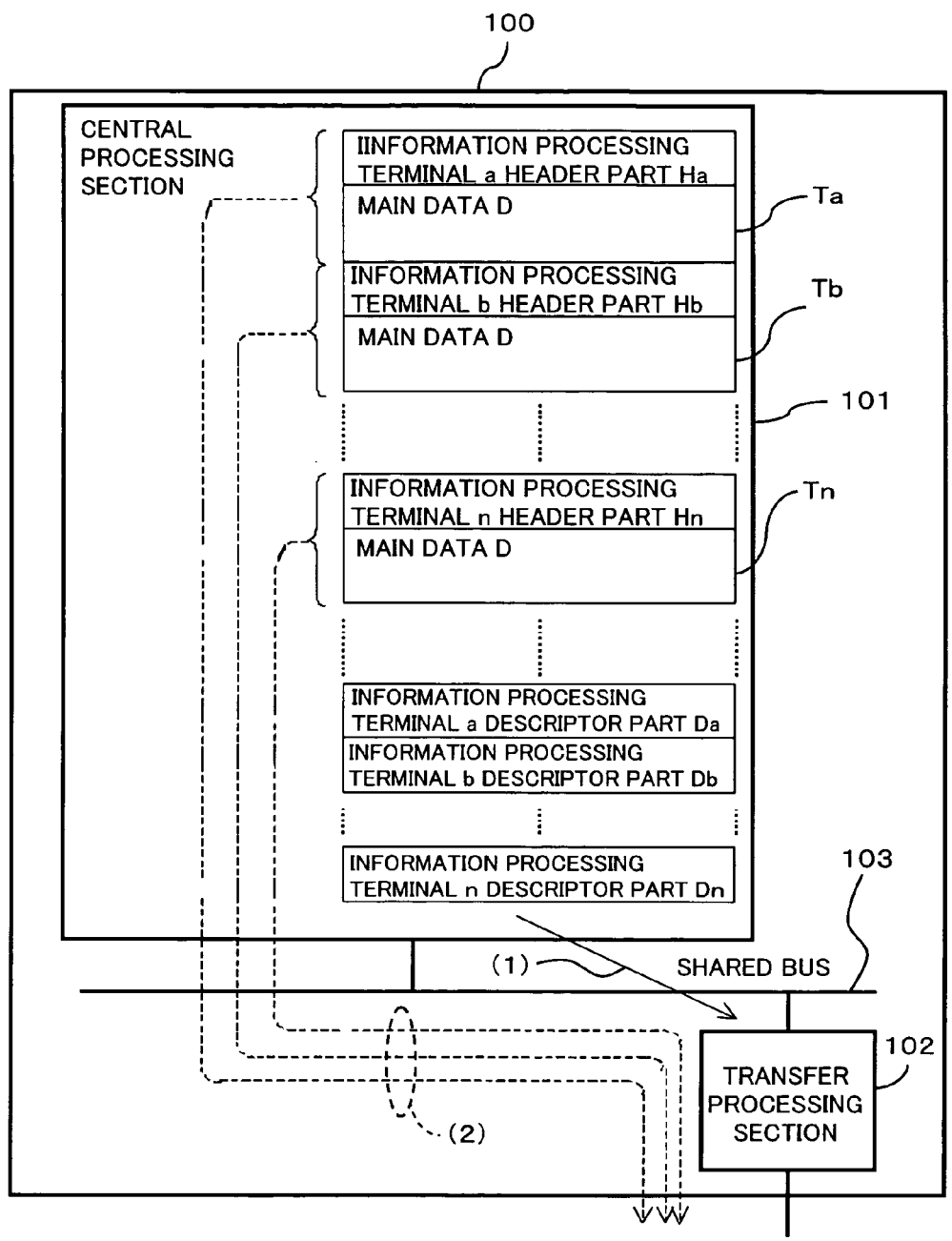
FIG. 17 is a schematic view illustrating data produced by a central processing section of the conventional information processing terminal shown in FIG. 16.
Figure 18:
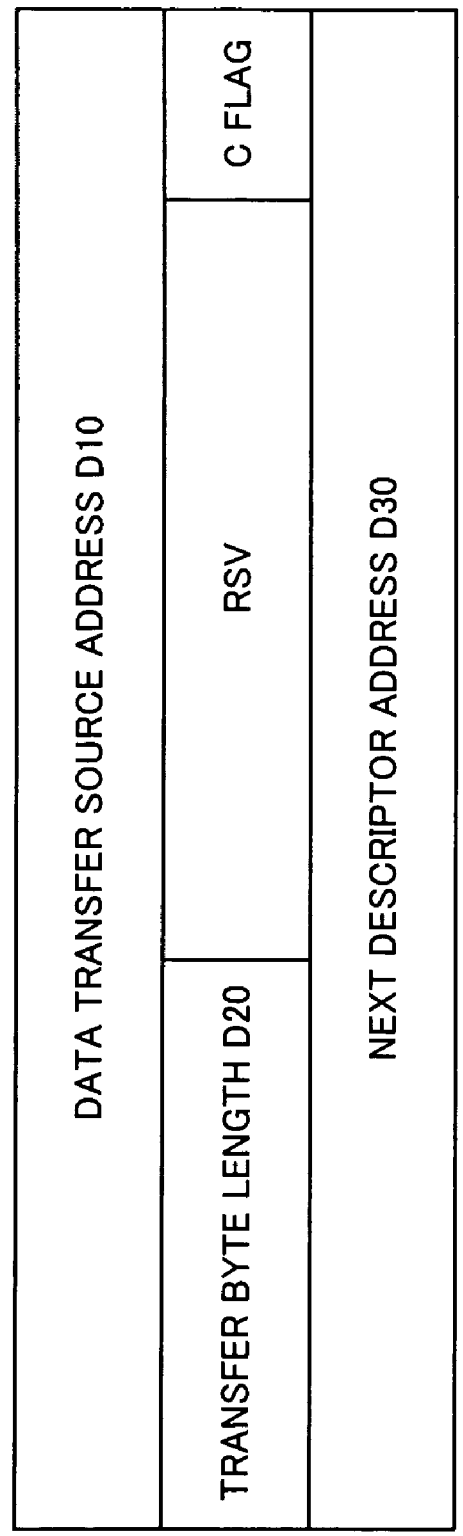
FIG. 18 is a view schematically showing a descriptor produced by the central processing section of the conventional information processing terminal shown in FIG. 16.
Figure 20:
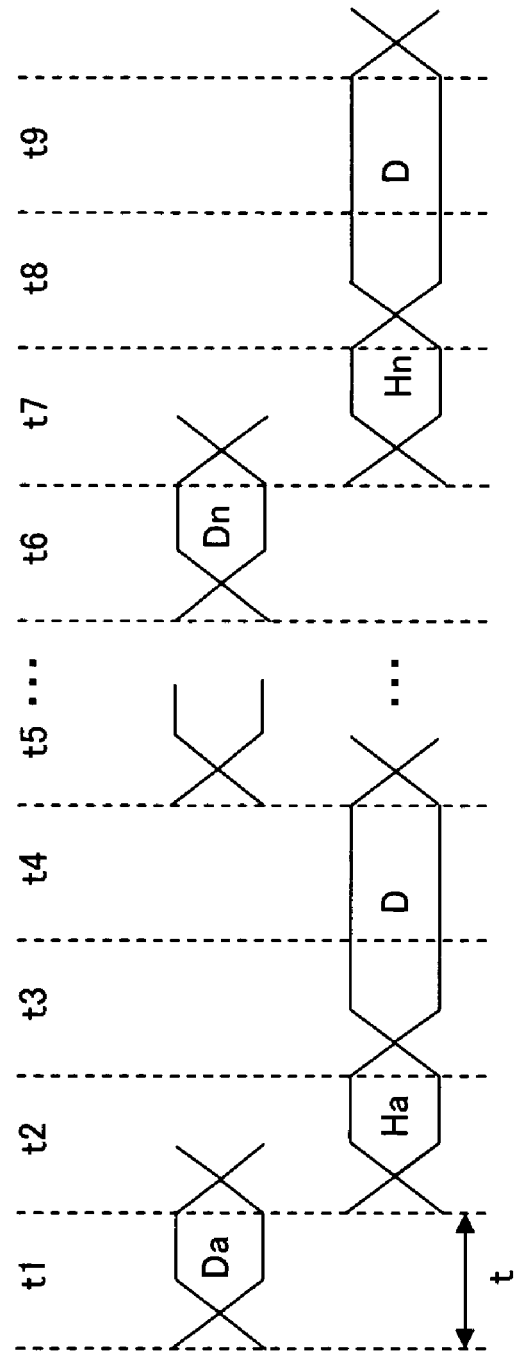
FIG. 20 is a time chart illustrating a flow of data on a shared bus upon data transfer by the information processing terminal shown in FIG. 16.

(1) With the information processing terminal 1 according to the present invention, similarly as in the conventional information processing terminal described hereinabove with reference to FIG. 17, if the central processing section 10 produces a header part and main data D in a paired relationship with each other (that is, produces transfer data) for each of information processing terminals of transfer destinations and produces a descriptor shown in FIG. 9 and then issues a transfer request to the transfer processing section 20, then the transfer data can be transferred directly to the information processing terminals of the transfer destinations without writing the data into the buffer 23 of the transfer processing section 20. In short, the data produced by and retained in the central processing section 10 can be transferred directed to the information processing terminals of the transfer destinations without writing the data into the buffer 23 of the transfer processing section 20.

In the descriptor in this instance, as seen in FIG. 9, an address on the central processing section 10 at which the transfer data is retained is set as the data transfer source address D1, and a data length of the transfer data is set as the transfer byte length D2. Further, the AB flag D4, NBE flag D5, BI flag D6 and C flag D7 are set to "0", and the next transfer source/storage destination buffer number D3 and the next descriptor address D8 are invalidated ("don't care" in FIG. 9).

(2) Further, with the information processing terminal 1 according to the present invention, if transfer data produced by the central processing section 10 and including a header part and main data D paired with each other is written into the buffer 23 of the transfer processing section 20 and then a descriptor shown in FIG. 10 is used to request transfer of the transfer data written in the buffer 23, then the transfer data written in the buffer 23 can be transferred to any information processing terminal of a transfer destination.

In the descriptor in this instance, as seen in FIG. 10, a buffer number of a partition of the buffer 23 in which the transfer data is written is set as the data transfer source address D1, and the AB flag D4 is set to "1". Further, the NBE flag D5, BI flag D6 and C flag D7 are set to "0", and the transfer byte length D2, next transfer source/storage destination buffer number D3 and next descriptor address D8 are invalidated ("don't care" in FIG. 10).

Figure 21:
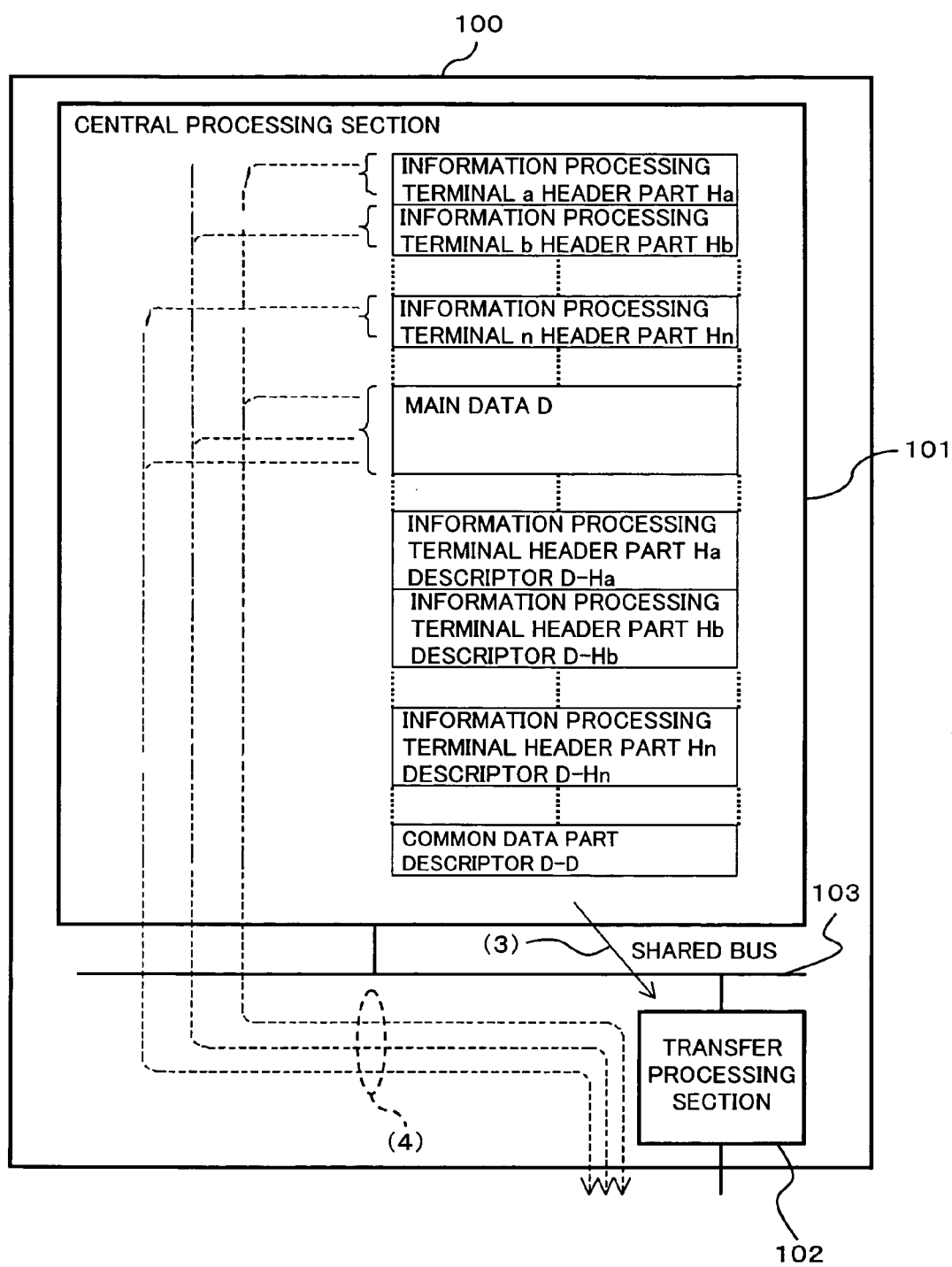
FIG. 21 is a schematic view illustrating a different example of data produced by the central processing section of the conventional information processing terminal shown in FIG. 16.
Figure 22:
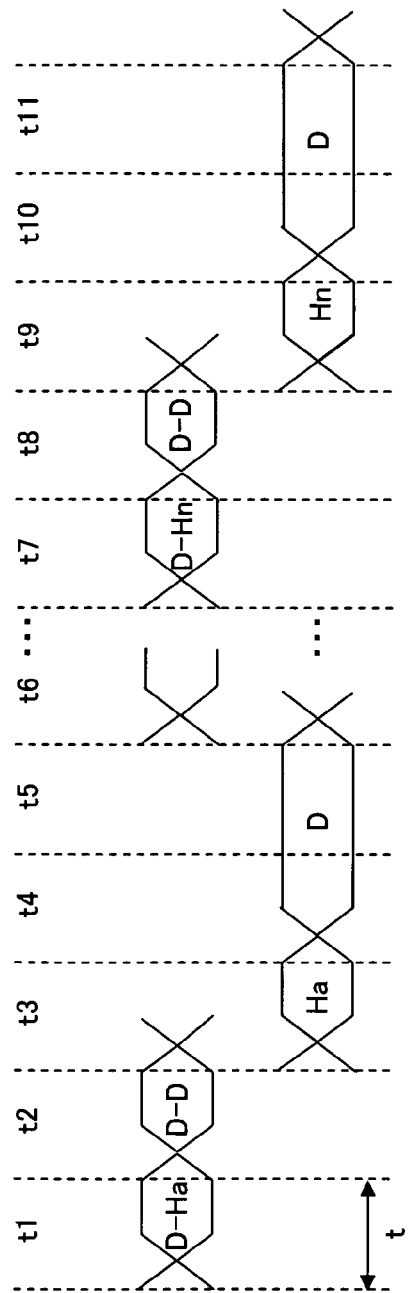
FIG. 22 is a time chart illustrating a flow of data on the shared bus upon data transfer by the information processing terminal shown in FIG. 21.

(3) Further, with the information processing terminal 1 according to the present invention, if the central processing section 10 produces a header part and main data D and remains them separately from each other and besides produces a header part descriptor and a main data descriptor illustrated in FIG. 11 and issues a request for transfer to the transfer processing section 20 similarly as in the conventional information processing terminal described hereinabove with reference to FIG. 21, then the header part and the main data can be transferred directly to any information processing terminal of a transfer destination without writing the data into the buffer 23 of the transfer processing section 20.

The descriptor in this instance is formed from the header part descriptor and the main data descriptor chained with each other as seen in FIG. 11. In the header part descriptor, an address on the central processing section 10 at which the header part is retained is set as the data transfer source address D1, and a data length of the header part is set as the transfer byte length D2. Further, the AB flag D4, NBE flag D5 and BI flag D6 are set to "0" while the C flag D7 is set to "1", and an address on the central processing section 10 of the main data descriptor which is a next descriptor is placed in the next descriptor address D8. It is to be noted that the next transfer source/storage destination buffer number D3 is invalidated ("don't care" in FIG. 11). Meanwhile, in the main data descriptor, an address on the central processing section 10 at which the main data is retained is set as the data transfer source address D1, and a data length of the main data is set as the transfer byte length D2. Further, the AB flag D4, NBE flag D5, BI flag D6 and C flag D7 are set to "0", and the next transfer source/storage destination buffer number D3 and the next descriptor address D8 are invalidated ("don't care" in FIG. 11).

(4) Further, with the information processing terminal 1 according to the present invention, if the central processing section 10 produces and writes a header part into the buffer 23 of the transfer processing section 20 and further produces and retains main data D and then produces a descriptor shown in FIG. 12 which includes a header part descriptor and a main data descriptor chained with each other and issues a request for transfer to the transfer processing section 20, then the header part written in the buffer 23 of the transfer processing section 20 and the main data D retained in the central processing section 10 can be transferred to any information processing terminal of a transfer destination.

The descriptor in this instance is formed from the header part descriptor and the main data descriptor chained with each other as shown in FIG. 12. In the header part descriptor, a buffer number of the buffer 23 of the transfer processing section 20 at which the header part is regained is set as the data transfer source address D1, and the AB flag D4 is set to "1" while the NBE flag D5 and the BI flag D6 are set to "0" and the C flag D7 is set to "1". Further, an address on the central processing section 10 of the main data descriptor which is a next descriptor is set as the next descriptor address D8. It is to be noted that the transfer byte length D2 and the next transfer source/storage destination buffer number D3 are invalidated ("don't care" in FIG. 12). Meanwhile, in the main data descriptor, an address on the central processing section 10 at which the main data is retained is set as the data transfer source address D1 and a data length of the main data is set as the transfer byte length D2. Further, the AB flag D4, NBE flag D5, BI flag D6 and C flag D7 are set to "0", and the next transfer source/storage destination buffer number D3 and the next descriptor address D8 are invalidated ("don't care" in FIG. 12). The data transfer example described just above can be applied effectively where different data are to be transferred successively to the same external information processing terminal.

(5) Further, with the information processing terminal 1 according to the present invention, if the central processing section 10 produces a header part and main data D and writes them separately from each other into the buffer 23 of the transfer processing section 20 and then produces a descriptor shown in FIG. 13 and issues a transfer request to the transfer processing section 20, then the header part and the main data written in the buffer 23 of the transfer processing section 20 can be transferred to any information processing terminal of a transfer destination.

In the description in this instance, as seen in FIG. 13, a buffer number of the buffer 23 of the transfer processing section 20 at which the header part is written is set as the data transfer source address D1, and a buffer number of the buffer 23 in which the main data is written is set as the next transfer source/storage destination buffer number D3. Further, the AB flag D4 and the NBE flag D5 are set to "1" while the BI flag D6 and the C flag D7 are set to "0". It is to be noted that the transfer byte length D2 and the next descriptor address D8 are invalidated ("don't care" in FIG. 13).

It is to be noted that, in this instance, where a buffer number of the buffer 23 at which the main data is written is set as the next transfer source/storage destination buffer number D3, a request for transfer of two data can be issued using a single descriptor, and therefore, the capacity of data which passes on the shared bus 30 can be reduced and degradation of the use efficiency of the shared bus 30 can be suppressed.

(6) Further, with the information processing terminal 1 according to the present invention, if the central processing section 10 produces a plurality of transfer data (in each of which a header part and main data are paired with each other) for each of information processing terminals of transfer destinations and writes the transfer data individually into the buffer 23 of the transfer processing section 20 and then produces a chained descriptor shown in FIG. 14 and issues a request for transfer to the transfer processing section 20, then the three data (denoted as transfer data a, b and c) written in the buffer 23 of the transfer processing section 20 can be transferred to the information processing terminals of the different transfer destinations.

The descriptor in this instance is formed, for example, from the two descriptors chained with each other as seen in FIG. 14. In one of the two descriptors, a buffer number of the buffer 23 of the transfer processing section 20 in which the main data a is retained is set as the data transfer source address D1, and a buffer number of the buffer 23 in which the next main data b is written is set as the next transfer source/storage destination buffer number D3. Further, the AB flag D4 and the NBE flag D5 are set to "1" while the BI flag D6 is set to "0" and the C flag D7 is set to "1", and an address on the central processing section 10 of the descriptor for the transfer data c which is a next descriptor is set as the next descriptor address D8. It is to be noted that the transfer byte length D2 is invalidated ("don't care" in FIG. 14). Meanwhile, in the other descriptor for the main data c, a buffer number of the buffer 23 of the transfer processing section 20 at which the main data c is retained is set as the data transfer source address D1, and the AB flag D4 is set to "1" while the NBE flag D5, BI flag D6 and C flag D7 are set to "0". Further, the transfer byte length D2, next transfer source/storage destination buffer number D3 and next descriptor address D8 are invalidated ("don't care" in FIG. 14).

It is to be noted that, since, in this instance, transfer of the three data (transfer data) can be performed using only two descriptors, the capacity of data which passes the shared bus 30 can be reduced and degradation of the use efficiency of the shared bus 30 can be suppressed.

What is claimed is:

1. An information processing terminal, comprising:
   a first processing section for producing a first transfer data, a second transfer data, and a data transfer descriptor for requesting transfer of the first transfer data; and
   a second processing section for receiving the first transfer data, the second transfer data, and the data transfer descriptor from said first processing section, and for transferring the first transfer data to the outside of said information processing terminal in accordance with the data transfer descriptor;
   said second processing section including;
   a buffer capable of temporarily storing the first transfer data;
   a merging section capable of merging the first transfer data stored in said buffer and the second transfer data to create transfer data; and
   a controlling section for controlling said merging section to merge the first and second transfer data in accordance with the data transfer descriptor and for performing transfer control of the transfer data,
   wherein said first processing section describes, in the data transfer descriptor to be produced to request transfer of the second transfer data to said second processing section, information of a storage source of the second transfer data and describes merge instruction information for instruction to merge the first and second transfer data, and then notifies said second processing section of the data transfer descriptor.

2. The information processing terminal as claimed in claim 1, wherein, in said second processing section, said controlling section refers to the data transfer descriptor to read out the second transfer data based on the information of the storage source of the transfer data and reads out the first transfer data from said buffer based on the merge instruction information, and then controls said merging section to merge the first and second transfer data read out.

3. An information processing terminal, comprising:
   a first processing section for producing a first transfer data, a second transfer data, and a data transfer descriptor for requesting transfer of the first transfer data; and
   a second processing section for receiving the first transfer data, the second transfer data, and the data transfer descriptor from said first processing section, and for transferring the first transfer data to the outside of said information processing terminal in accordance with the data transfer descriptor;
   said second processing section including:
   a buffer capable of temporarily storing the first transfer data;
   a merging section capable of merging the first transfer data stored in said buffer and the second transfer data to create transfer data; and
   a controlling section for controlling said merging section to merge the first and second transfer data in accordance with the data transfer descriptor and for performing transfer control of the transfer data,
   wherein, where the same main data is to be transferred to a plurality of transfer destinations, said first processing section produces and writes, for each of the transfer destinations, the main data as the first transfer data into said buffer, and produces the header part as the second transfer data including the information of the transfer destination and to be added to the main data and the data transfer descriptor for requesting the merging of the header part and the main data and the transfer of the merged data and notifies said second processing section of the data transfer descriptor.

4. An information processing terminal, comprising:
   a first processing section for producing a first transfer data, a second transfer data, and a data transfer descriptor for requesting transfer of the first transfer data; and
   a second processing section for receiving the first transfer data, the second transfer data, and the data transfer descriptor from said first processing section, and for transferring the first transfer data to the outside of said information processing terminal in accordance with the data transfer descriptor;
   said second processing section including:
   a buffer capable of temporarily storing the first transfer data;
   a merging section capable of merging the first transfer data stored in said buffer and the second transfer data to create transfer data; and
   a controlling section for controlling said merging section to merge the first and second transfer data in accordance with the data transfer descriptor and for performing transfer control of the transfer data,
   wherein said first processing section produces a buffer writing descriptor for requesting writing of the first transfer data into said buffer to said second processing section and notifies said second processing section of the buffer writing descriptor, and said controlling section of said second processing section reads out and writes the first transfer data into said buffer in accordance with the buffer writing descriptor received from said first processing section.

5. The information processing terminal as claimed in claim 4, wherein said first processing section produces the buffer writing descriptor in the same format as that of the data transfer descriptor and describes the information of the storage source of the first transfer data and buffer writing instruction information for instruction to write the first transfer data into said buffer in the buffer writing descriptor, and then notifies said second processing section of the buffer writing descriptor.

6. The information processing terminal as claimed in claim 5, wherein, in said second processing section, said controlling section refers to the buffer writing descriptor to read out the first transfer data based on the information of the storage source included in the first transfer data and writes the first transfer data read out into said buffer.

7. A transfer processing apparatus for transferring a first transfer data produced by a processing section in accordance with data transfer descriptor received from said processing section, comprising:
   a buffer capable of temporarily storing the first transfer data;
   a merging section capable of merging the first transfer data stored in said buffer and a second transfer data produced separately from the first transfer data by said processing section to create transfer data; and
   a controlling section for controlling said merging section to merge the first and second transfer data in accordance with the data transfer descriptor and performing transfer control of the transfer data,
   wherein a notification of a data transfer descriptor in which information of a storage source of the second transfer data and merging instruction information for instruction for merging of the first and second transfer data are described is issued as the data transfer descriptor from said processing section.

8. The transfer processing apparatus as claimed in claim 7, wherein said controlling section refers to the data transfer descriptor to read out the second transfer data based on the information of the storage source of the second transfer data and read out the first transfer data from said buffer based on the merging instruction information, and then controls said merging section to merge the first and second transfer data read out.

9. A transfer processing apparatus for transferring a first transfer data produced by a processing section in accordance with data transfer descriptor received from said processing section, comprising:
- a buffer capable of temporarily storing the first transfer data;
- a merging section capable of merging the first transfer data stored in said buffer and a second transfer data produced separately from the first transfer data by said processing section to create transfer data; and
- a controlling section for controlling said merging section to merge the first and second transfer data in accordance with the data transfer descriptor and performing transfer control of the transfer data,
- wherein, in order to transfer the same main data to a plurality of transfer destinations, the main data produced by said processing section is written as the first transfer data into said buffer, and a notification of a data transfer descriptor for requesting merging of the header part as the second transfer data produced for each of the transfer destinations by said processing section with the main data and transferring of the merged data is received from said processing section.

10. A transfer processing apparatus for transferring a first transfer data produced by a processing section in accordance with data transfer descriptor received from said processing section, comprising:
- a buffer capable of temporarily storing the first transfer data;
- a merging section capable of merging the first transfer data stored in said buffer and a second transfer data produced separately from the first transfer data by said processing section to create transfer data; and
- a controlling section for controlling said merging section to merge the first and second transfer data in accordance with the data transfer descriptor and performing transfer control of the transfer data,
- wherein a notification of a buffer writing descriptor for requesting writing of the first transfer data into said buffer is received from said processing section, and said controlling section reads out and writes the first transfer data into said buffer in accordance with the buffer writing descriptor received from said processing section.

11. The transfer processing apparatus as claimed in claim 10, wherein a notification of a buffer writing descriptor in which the information of the storage source of the first transfer data and buffer writing instruction information for instruction for writing of the first transfer data into said buffer are described in the same format as that of the data transfer descriptor is received as the buffer writing descriptor from said processing section.

12. The transfer processing apparatus as claimed in claim 11, wherein said controlling section refers to the buffer writing descriptor to read out the first transfer data based on the information of the storage source included in the first transfer data and writes the first transfer data read out into said buffer.

13. An information processing terminal, connected with a plurality of external information processing terminals via a network, for transferring the same data to the plural external information processing terminals individually through the network, comprising:
- a first processing section for producing
  - main data to be transferred to the plural external information processing terminals,
  - a plurality of header parts, associated each with a respective one of the plural external information processing terminals, each of the plural header parts for being added to the main data and including transfer destination information of the main data, and
  - a plurality of data transfer descriptors, associated each with a respective one of the plural external information processing terminals, each of the plural data transfer descriptors being for requesting transfer of the main data to the respective one external information processing terminal; and
- a second processing section for receiving the main data, the plural header parts, and the plural data transfer descriptors from said first processing section, and transferring the main data to the plural external information processing terminals individually in accordance with the plural data transfer descriptors, said second processing section including
  - a buffer for temporarily storing the main data,
  - a merging section capable of merging the main data stored in said buffer with each of the plural header parts to create transfer data, and
  - a controlling section for, by reference to each of the plural data transfer descriptors, controlling said merging section to merge the main data with the respective one of the plural header parts, and for carrying out transfer control of the created transfer data.

14. A transfer processing apparatus connected with a processing section and a plurality of information processing terminals, for transferring the same data from the processing section to the plural information processing terminals individually,
said transfer processing apparatus receiving, from said processing section,
- main data to be transferred to the plural information processing terminals,
- a plurality of header parts, associated each with a respective one of the plural information processing terminals, each of the plural header parts for being added to the main data and including transfer destination information of the main data, and
- a plurality of data transfer descriptors, associated each with a respective one of the plural information processing terminals, each of the plural data transfer descriptors being for requesting transfer of the main data to the respective one information processing terminal, and said transfer processing apparatus including
- a buffer for temporarily storing the main data,
- a merging section capable of merging the main data stored in said buffer with each of the plural header parts to create transfer data, and
- a controlling section for, by reference to each of the plural data transfer descriptors, controlling said merging section to merge the main data with the respective one of the plural header parts, and for carrying out transfer control of the created transfer data.

* * * * *

UNITED STATES PATENT AND TRADEMARK OFFICE
CERTIFICATE OF CORRECTION

PATENT NO. : 7,237,044 B2
APPLICATION NO. : 10/806332
DATED : June 26, 2007
INVENTOR(S) : Kazumi Hayasaka It is certified that error appears in the above-identified patent and that said Letters Patent is hereby corrected as shown below:

Col. 19, line 20, after "including" delete ";" and insert --:--.

Signed and Sealed this

Sixth Day of November, 2007

JON W. DUDAS
*Director of the United States Patent and Trademark Office*